(12) United States Patent
Perez

(10) Patent No.: US 9,811,519 B2
(45) Date of Patent: Nov. 7, 2017

(54) GENERATIVE DISCRIMINATIVE APPROACH FOR TRANSACTIONAL DIALOG STATE TRACKING VIA COLLECTIVE MATRIX FACTORIZATION

(71) Applicant: Conduent Business Services, LLC, Dallas, TX (US)

(72) Inventor: Julien Perez, Grenoble (FR)

(73) Assignee: Conduent Business Services, LLC, Dallas, TX (US)

( * ) Notice: Subject to any disclaimer, the term of this patent is extended or adjusted under 35 U.S.C. 154(b) by 116 days.

(21) Appl. No.: 14/864,076

(22) Filed: Sep. 24, 2015

(65) Prior Publication Data

US 2017/0091171 A1    Mar. 30, 2017

(51) Int. Cl.
| | |
|---|---|
| *G06F 17/00* | (2006.01) |
| *G10L 15/00* | (2013.01) |
| *G06Q 30/00* | (2012.01) |
| *G06F 17/27* | (2006.01) |
| *G10L 15/22* | (2006.01) |

(52) U.S. Cl.
CPC ............ *G06F 17/279* (2013.01); *G10L 15/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,019,958 | A | * 5/1991 | Varga | ...................... H02P 23/16 318/615 |
| 5,946,656 | A | * 8/1999 | Rahim | .................. G10L 15/144 704/240 |
| 6,151,698 | A | * 11/2000 | Telichevesky | ...... G06F 17/5036 703/13 |
| 6,308,157 | B1 | * 10/2001 | Vanbuskirk | ............. G10L 15/26 704/240 |
| 7,197,460 | B1 | * 3/2007 | Gupta | ..................... G10L 15/22 704/251 |

(Continued)

OTHER PUBLICATIONS

Bishop, et al., "Generative or discriminative? Getting the best of both worlds," Bayesian Statistics, vol. 8, pp. 3-24 (2007).

(Continued)

*Primary Examiner* — Fariba Sirjani
(74) *Attorney, Agent, or Firm* — Fay Sharpe LLP

(57) ABSTRACT

A computer-implemented method for dialog state tracking employs first and second latent variable models which have been learned by reconstructing a decompositional model generated from annotated training dialogs. The decompositional model includes, for each of a plurality of dialog state transitions corresponding to a respective turn of one of the training dialogs, state descriptors for initial and final states of the transition and a respective representation of the dialog for that turn. The first latent variable model includes embeddings of the plurality of state transitions, and the second latent variable model includes embeddings of features of the state descriptors and embeddings of features of the dialog representations. Data for a new dialog state transition is received, including a state descriptor for the initial time and a respective dialog representation. A state descriptor for the final state of the new dialog state transition is predicted using the learned latent variable models.

16 Claims, 6 Drawing Sheets

(56) References Cited

U.S. PATENT DOCUMENTS

| | | | | |
|---|---|---|---|---|
| 7,742,591 | B2* | 6/2010 | Paek | H04M 3/527 |
| | | | | 379/265.01 |
| 7,869,998 | B1* | 1/2011 | Di Fabbrizio | G10L 13/00 |
| | | | | 704/1 |
| 8,498,944 | B2* | 7/2013 | Solomon | G06Q 30/0601 |
| | | | | 705/26.1 |
| 8,660,849 | B2* | 2/2014 | Gruber | G06F 17/3087 |
| | | | | 340/988 |
| 8,935,167 | B2* | 1/2015 | Bellegarda | G10L 15/063 |
| | | | | 704/231 |
| 9,368,114 | B2* | 6/2016 | Larson | H04M 1/72522 |
| 9,430,463 | B2* | 8/2016 | Futrell | G06F 17/2211 |
| 9,431,006 | B2* | 8/2016 | Bellegarda | G10L 15/08 |
| 9,502,031 | B2* | 11/2016 | Paulik | G10L 15/19 |
| 9,576,574 | B2* | 2/2017 | van Os | |
| 2003/0110028 | A1* | 6/2003 | Bush | G10L 15/22 |
| | | | | 704/231 |
| 2004/0066401 | A1* | 4/2004 | Bushey | G06Q 10/06 |
| | | | | 715/744 |
| 2005/0123053 | A1* | 6/2005 | Cooper | G11B 27/28 |
| | | | | 375/240.24 |
| 2006/0190241 | A1* | 8/2006 | Goutte | G06F 17/2827 |
| | | | | 704/2 |
| 2014/0156579 | A1 | 6/2014 | Bouchard et al. | |
| 2015/0095033 | A1 | 4/2015 | Boies et al. | |
| 2015/0363393 | A1* | 12/2015 | Williams | G06F 17/289 |
| | | | | 704/8 |
| 2016/0078520 | A1* | 3/2016 | Nice | G06Q 30/0631 |
| | | | | 705/26.7 |
| 2016/0246929 | A1* | 8/2016 | Zenati | G06F 19/3425 |
| 2017/0061956 | A1* | 3/2017 | Sarikaya | G10L 15/005 |

OTHER PUBLICATIONS

Bunt, et al., "Towards an ISO standard for dialogue act annotation," Proc. 7th Int'l Conf. on Language Resources and Evaluation (LREC'10), European Language Resources Association (ELRA), pp. 2548-2555 (2010).

Ghahramani, et al., "Factorial Hidden Markov Models," Machine Learning, vol. 29(2-3), pp. 245-273 (1997).

Gasic, et al., "Effective handling of dialogue state in the hidden information state POMPD-based dialogue manager" Journal ACM Transactions on Speech and Language Processing (TSLP), vol. 7(3):4, pp. 1-4 (2011).

Henderson, et al., "Deep Neural Network Approach for the Dialog State Tracking Challenge," Proc. SIGDIAL 2013, pp. 467-471 (2013).

Henderson, et al., "Word-based dialog state tracking with recurrent neural networks," Proc. SIGDIAL, pp. 296-299 (2014).

Lee, et al., "Recipe for building robust spoken dialog state trackers: Dialog state tracking challenge system description," Proc. SIGDIAL 2013, pp. 414-422 (2013).

Lee, et al., "Unsupervised spoken language understanding for a multi-domain dialog system," IEEE Trans. on Audio, Speech & Language Processing, vol. 21(11), pp. 2451-2464 (2013).

Metallinou, et al., "Discriminative state tracking for spoken dialog systems," Association for Computer Linguistics, pp. 466-475 (2013).

Milone, et al., "Prosodic and accentual information for automatic speech recognition," IEEE Trans. on Speech and Audio Processing, vol. 11(4), pp. 321-333 (2003).

Nuance Communications, "Grammar developer's guide," pp. 1-170 (2007).

Paek, et al., "Conversation as action under uncertainty," UAI '00: Proc. 16th Conf. in Uncertainty in Artificial Intelligence, pp. 455-464 (2000).

Raux, et al., "Efficient probabilistic tracking of user goal and dialog history for spoken dialog systems," Interspeech, pp. 801-804 (2011).

Thomson, et al., "Bayesian update of dialogue state: A POMDP framework for spoken dialogue systems," Computer Speech & Language, vol. 24(4), pp. 562-588 (2010).

Ulusoy, et al., "Comparison of generative and discriminative techniques for object detection and classification," Toward Category-Level Object Recognition, pp. 173-195 (2006).

Wang, "HWU baseline belief tracker for DSTC 2 & 3," Technical report, Heriot-Watt University, pp. 1-4 (2013).

Williams, "Using particle filters to track dialogue state," IEEE Workshop on Automatic Speech Recognition & Understanding, ASRU 2007, pp. 502-507 (2007).

Williams, "Exploiting the ASR n-best by tracking multiple dialog state hypotheses," Interspeech, pp. 191-194 (2008).

Williams, "Incremental partition recombination for efficient tracking of multiple dialog states," ICASSP, pp. 5382-5385 (2010).

Williams, "Challenges and opportunities for state tracking in statistical spoken dialog systems: Results from two public deployments," J. Sel. Topics Signal Processing, vol. 6(8), pp. 959-970 (2012).

Williams, "Web-style ranking and SLU combination for dialog state tracking," Proc. SIGDIAL, pp. 282-291 (Jun. 2014).

Williams, et al., "Factored partially observable Markov decision processes for dialogue management," 4th Workshop on Knowledge and Reasoning in Practical Dialog Systems, pp. 76-82 (2005).

Williams, et al., "The dialog state tracking challenge," Proc. SIGDIAL 2013 Conf., pp. 404-413 (2013).

Williams, et al., "Partially observable Markov decision processes for spoken dialog systems," Computer Speech & Language, vol. 21(2), pp. 393-422 (2007).

Young, et al., "POMDP-based statistical spoken dialog systems: A review," Proc. IEEE, vol. 101(5), pp. 1160-1179 (2013).

Žilka, et al., "Comparison of Bayesian Discriminative and Generative Models for Dialogue State Tracking," Proc. SIGDIAL 2013, pp. 452-456 (2013).

* cited by examiner

FIG. 7

| | STATE DESCRIPTOR FEATURES $S_t$ | | | | | | STATE DESCRIPTOR FEATURES $S_{t+1}$ | | | | | | BOW FEATURES | | | | | | | | | | Dialog |
|---|---|---|---|---|---|---|---|---|---|---|---|---|---|---|---|---|---|---|---|---|---|---|---|
| | LOC | | TYP | | TIME | | LOC | | TYP | | TIME | | | | | | | | | | | | |
| | ROME | PARIS | SPANISH | FRENCH | 7PM | 8PM | ROME | PARIS | SPANISH | FRENCH | 7PM | 8PM | BARCELONA | PARIS | ROME | EAT | TIME | 7PM | 8PM | YES | SPANISH | FRENCH | |
| TURN 1 | 0 | 0 | 0 | 0 | 0 | 0 | 0.9 | 0.1 | 0 | 0 | 0 | 0 | 0 | 0 | 1 | 1 | 0 | 0 | 0 | 0 | 0 | 0 | S-Where do you want to dine? / C-I want to eat in Rome? |
| TURN 2 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | S-What type of food? / C-I'd like Spinach |
| TURN 3 | 1 | 0 | 0 | 0 | 0 | 0 | 1 | 0 | 1 | 0 | 0 | 0 | 0 | 0 | 0 | 0 | 0 | 0 | 0 | 1 | 1 | 0 | S-Did you say Spanish? / C-Yes |
| TURN 4 | 1 | 0 | 1 | 0 | 0 | 0 | 1 | 0 | 1 | 0 | 0.2 | 0.8 | 0 | 0 | 0 | 0 | 0 | 0 | 1 | 0 | 0 | 0 | S-What time? / C-about 8 pm. |
| TURN 5 | 1 | 0 | 1 | 0 | 0 | 1 | 1 | 0 | 1 | 0 | 0 | 1 | 0 | 0 | 1 | 1 | 0 | 0 | 1 | 1 | 0 | 0 | S-OK, you'd like to eat in Rome, Spanish food, at 8pm? / C-yes |

GENERATIVE DISCRIMINATIVE APPROACH FOR TRANSACTIONAL DIALOG STATE TRACKING VIA COLLECTIVE MATRIX FACTORIZATION

BACKGROUND

The exemplary embodiment relates to dialog systems and finds particular application in connection with a system and method for tracking a dialog state using collective matrix factorization.

Automated dialog systems interact with users via natural language to help them achieve a goal. As an example, a user may be interested in finding a restaurant and may have a set of constraints, such as geographic location, date, and time. The system offers the name of a restaurant that satisfies the constraints. The user may then request additional information about the restaurant. The dialogue continues until the user's questions are answered. There are many other applications where dialog systems would be advantageous. For example, in the context of customer care, efficient automation could bring a gain of productivity by increasing the probability of success of each call while reducing the overall cost.

The use of autonomous dialog systems is rapidly growing with the spread of smart mobile devices but still faces challenges to becoming a primary user interface for natural interaction using conversations. In particular, when dialogs are conducted in noisy environments or when utterances themselves are noisy, it can be difficult for the system to recognize or understand the user utterances.

Dialog systems often include a dialog state tracker which monitors the progress of the dialogue (dialog and dialogue may be used interchangeably herein). The dialog state tracker provides a compact representation of the past user input and system output in the form of a dialog state. The dialog state encapsulates the information needed to successfully finish the dialogue, such as the user's goal or requests. The term "dialog state" loosely denotes a representation of the knowledge of user needs at any point in a dialogue. The precise nature of the dialog state depends on the associated dialog task. An effective dialog system benefits from a state tracker which is able to accumulate evidence, in the form of observations, accurately over the sequence of turns of a dialogue, and adjust the dialog state according to the observations. However, in spoken dialog systems, where the user utterance is input as a voice recording, the errors incurred by Automatic Speech Recognition (ASR) and Natural Language Understanding (NLU) means that the true user utterance may not be directly observable. This makes it difficult to compute the true dialog state.

A common mathematical representation of a dialog state is a slot-filling schema. See, for example, Williams, et al., "Partially observable Markov decision processes for spoken dialog systems," Computer Speech & Language, 21(2):393-422, 2007, hereinafter, "Williams 2007". In this approach, the state is composed of a predefined set of variables with a predefined domain of expression for each of them. The goal of the dialog system is to instantiate each of the variables efficiently in order to perform an associated task and satisfy the corresponding intent of the user. In the restaurant case, for example, this may include, for each of a set of variables, a most probable value of the variable, such as: location: downtown; date: August 14; time: 7.30 pm; restaurant type: Spanish, (or unknown if the variable has not been assigned a different value).

Various approaches have been suggested for defining dialog state trackers. Some systems use hand-crafted rules that rely on the most likely result from an NLU module. However, these rule-based systems are prone to frequent errors as the most likely result is not always correct. Moreover, these systems often drive the customer to respond using simple keywords and to confirm everything they say explicitly, which is far from a natural conversational interaction. See, Williams, "Web-style ranking and SLU combination for dialogue state tracking," Proc. SIGDIAL, pp. 282-291, June 2014. More recent methods take a statistical approach to estimating the posterior distribution over the dialog states using the results of the NLU step. Statistical dialog systems, in maintaining a distribution over multiple hypotheses of the true dialog state, are able to behave in a robust manner when faced with noisy conditions and ambiguity.

Statistical dialog state trackers can be categorized into two general approaches (generative and discriminative), depending on how the posterior probability distribution over the state calculation is modeled. The generative approach uses a generative model of the dialog dynamic that describes how the NLU results are generated from the hidden dialog state and uses the Bayes rule to calculate the posterior probability distribution. The generative approach has been a popular approach for statistical dialog state tracking, since it naturally fits into the Partially Observable Markov Decision Process (POMDP) type of modeling, which is an integrated model for dialog state tracking and dialog strategy optimization. See, Young, et al., "POMDP-based statistical spoken dialog systems: A review," Proc. IEEE, 101(5):1160-1179, 2013. In the context of POMDP, dialog state tracking is the task of calculating the posterior distribution over the hidden states, given the history of observations.

The discriminative approach aims at directly modeling the posterior distribution through an algebraic closed formulation of a loss minimization problem.

Generative systems are described, for example, in Williams 2007; Williams, "Exploiting the ASR n-best by tracking multiple dialog state hypotheses," INTERSPEECH, pp. 191-194, 2008; Williams, "Incremental partition recombination for efficient tracking of multiple dialog states," ICASSP, pp. 5382-5385, 2010; Thomson, et al., "Bayesian update of dialog state: A POMDP framework for spoken dialogue systems," Computer Speech & Language, 24(4): 562-588, 2010, hereinafter, "Thomson 2010."

Discriminative systems are described, for example, in Paek, et al., "Conversation as action under uncertainty," UAI '00: Proc. 16th Conf. in Uncertainty in Artificial Intelligence, pp. 455-464, 2000, and in Thomson 2010. The successful use of discriminative models for belief tracking has recently been reported in Williams, "Challenges and opportunities for state tracking in statistical spoken dialog systems: Results from two public deployments," J. Sel. Topics Signal Processing, 6(8):959-970, 2012; Henderson, et al., "Deep Neural Network Approach for the Dialog State Tracking Challenge," Proc. SIGDIAL 2013, pp. 467-471, 2013).

Each of these statistical approaches suffers from some limitations, such as complex inference at test time, scalability, or restrictions on the set of possible state variables in learning.

INCORPORATION BY REFERENCE

The following references, the disclosures of which are incorporated herein by reference in their entireties, are mentioned:

U.S. Pub. No. 20140156579, published Jun. 5, 2014, entitled CONVEX COLLECTIVE MATRIX FACTORIZATION, by Guillaume Bouchard, et al.

U.S. Pub. No. 20150095033, published Apr. 2, 2015, entitled TECHNIQUES FOR UPDATING A PARTIAL DIALOG STATE, by Boies, et al.

BRIEF DESCRIPTION

In accordance with one aspect of the exemplary embodiment, a method for dialog state tracking includes providing first and second latent variable models which have been learned by reconstructing a decompositional model. The decompositional model is one which has been generated from annotated training dialogues and includes, for each of a plurality of dialog state transitions, state descriptors for initial and final states of the transition and a respective dialogue representation. The learned first latent variable model includes embeddings of the plurality of state transitions. The learned second latent variable model includes embeddings of features of the state descriptors and embeddings of features of the dialogue representations. Data for a new dialog state transition is received. The data includes a state descriptor for the initial time and a respective dialogue representation. A state descriptor for the final state of the new dialog state transition is predicted based thereon, using the learned first and second latent variable models.

The predicting of the state descriptor may be performed with a processor.

In accordance with another aspect of the exemplary embodiment, a system for dialog state tracking includes memory which stores first and second latent variable models that have been learned by reconstructing a decompositional model. The decompositional model has been generated from annotated training dialogues and includes, for each of a plurality of dialog state transitions, state descriptors for initial and final states of the transition and a respective dialogue representation. The learned first latent variable model includes embeddings of the plurality of state transitions. The learned second latent variable model includes embeddings of features of the state descriptors and embeddings of features of the dialogue representations. An information gathering component receives an utterance of a user for each of a plurality of new dialog state transitions. A representation generation component generates a dialog representation based on the user utterance. A prediction component predicts a state descriptor for a final state of each new dialog state transition using the learned first and second latent variable models and the respective dialog representation and a corresponding initial state descriptor. A processor implements the information gathering component, representation generation component, and the prediction component.

In accordance with another aspect of the exemplary embodiment, a method for identifying a transaction includes learning first and second latent variable models for reconstructing a decompositional model, the decompositional model having been generated from annotated training dialogues and including, for each of a plurality of dialog state transitions, state descriptors for initial and final states of the transition and a respective dialogue representation. The learned first latent variable model includes embeddings of the plurality of state transitions, and the learned second latent variable model includes embeddings of features of the state descriptors and embeddings of features of the dialogue representations. For each of a plurality of turns of a dialogue, the method includes receiving data for a new dialog state transition, the data including a state descriptor for the initial time and a respective dialogue representation, predicting a state descriptor for the final state of the new dialog state transition using the learned first and second latent variable models, and generating an agent dialog act based on the predicted state descriptor. Based on the predicted final state of at least one of the turns of the dialogue, a transaction to be implemented is identified.

BRIEF DESCRIPTION OF THE DRAWINGS

FIG. 7 illustrates generation of matrix M during the exemplary prediction method.

DETAILED DESCRIPTION

Aspects of the exemplary embodiment relate to a system and method for dialog state tracking by estimating the true dialog state of a dialogue in progress from noisy observations produced by speech recognition and/or natural language understanding modules.

The exemplary system and method enable statistical dialog state tracking based on a joint probabilistic model that provides an inference schema through collective matrix factorization. The dialog state tracker performs well in comparison with existing approaches. The prediction schema is also computationally efficient in comparison to existing approaches. The method includes tracking a posterior distribution over hidden dialog states composed of a set of context-dependent variables. A dialog policy, once learnt, strives to select an optimal system action given the estimated dialog state by optimizing a defined reward function.

A generative/discriminative type of approach for state tracking is described herein which makes use of spectral decomposition methods and associated inference procedures. The exemplary probabilistic model jointly estimates the state transition with respect to a set of observations. In an exemplary embodiment, the state transition is computed with an inference procedure having a linear complexity with respect to the number of variables and observations.

Figure 1:
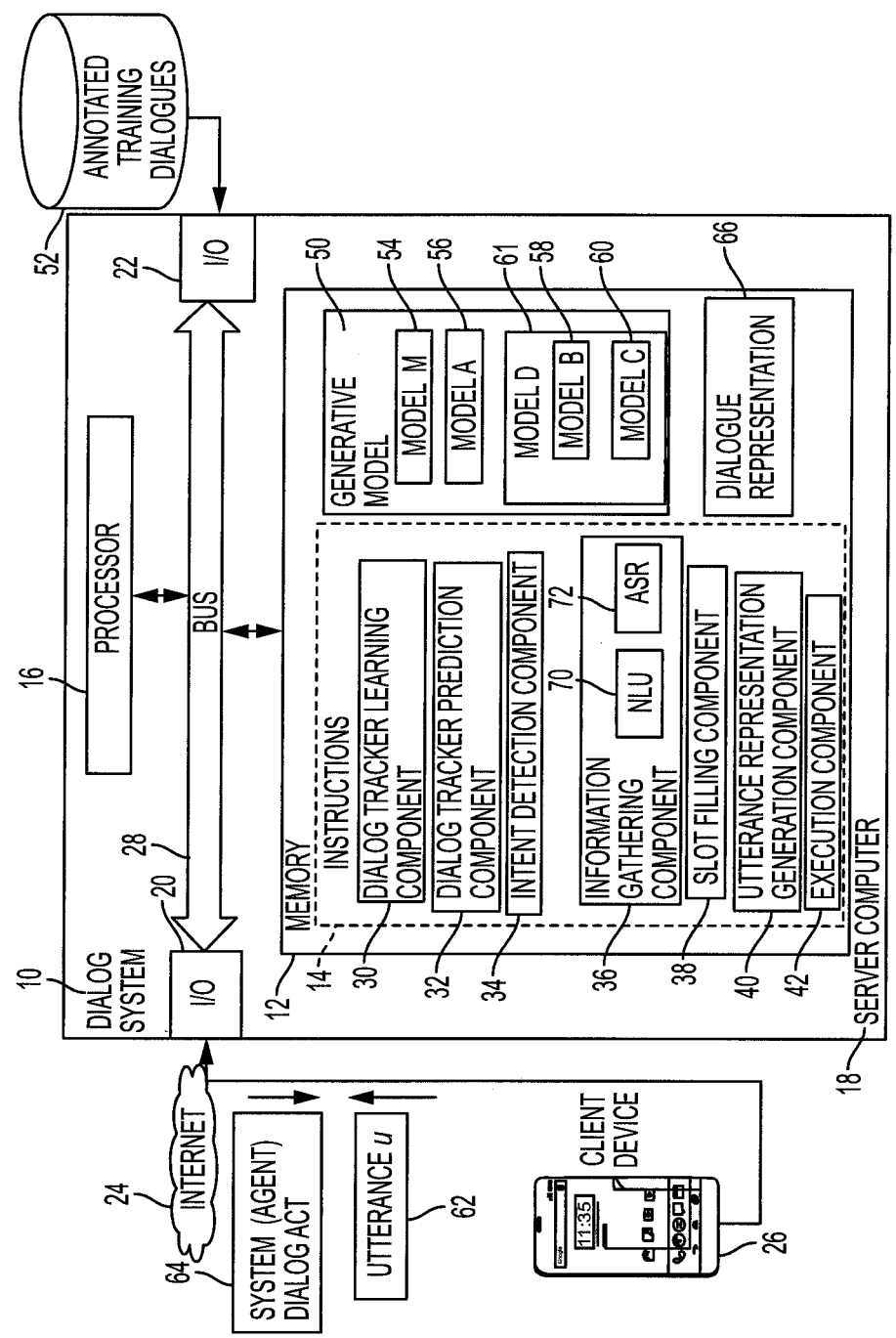
FIG. 1 is a functional block diagram of a dialog system in accordance with one aspect of the exemplary embodiment.

With reference to FIG. 1, a transactional dialog system 10 for completing a transaction through automated analysis of user utterances is illustrated. The user utterances may be textual or audible (spoken) utterances or a combination thereof. The system 10 includes memory 12 which stores instructions 14 for performing the method illustrated in FIG. 2 and a processor 16 in communication with the memory for executing the instructions. The system 10 may include one or more computing devices 18, such as the illustrated server computer. One or input/output devices 20, 22 allow the system to communicate with external devices, such as the illustrated client device 24 via wired or wireless connections, such as the Internet 26. Hardware components 12, 16, 20, 22 of the system are communicatively connected by a data/control bus 28.

The software instructions 14 include a dialog tracker learning component 30 and a dialog tracker prediction component 32, referred to herein as a spectral state tracker or SST. The system may further include an intent detection component 34, an information gathering component 36, a slot filling component 38, an utterance representation component 40, and an execution component 42.

Briefly, the learning component 30 learns a generative model 50 which forms the basis of the spectral state tracker 32. The learning is performed with a collection 52 of annotated training dialogues using Collective Matrix Factorization (CMF). In particular, a decompositional model M 54, which includes state descriptors and corresponding dialog representations for each of a set of turns, is used for learning a plurality of coupled temporal hidden (latent) variable models A, B and C 56, 58, 60. Model A includes embeddings of the observed dialog state transitions, Model B includes embeddings of each of the features of the state descriptors, and model C includes embeddings of each of the dialog representation features. Models B and C may be combined into a single model D 61. Given the learned generative model 50, when a new utterance 62 is received for an initial time t, the spectral state tracker 32 updates the generative model 50 and predicts the dialog state at a final (subsequent) time t+1.

If there is more than one type of transaction handled by the system, the intent detection component 34 identifies the user's intent in order to determine the set of variables to be instantiated in the generative model 50. As an example, the user of the client device 24 may express an intent to book a flight and the intent detection component 34 identifies the variables: destination, date, and time (hour), which are each to be instantiated from a respective set of predefined values. The variables correspond to the slots to be filled by the slot filling component 38 using information from the SST 32.

The information gathering component 36 implements an information gathering policy, which automatically generates virtual agent dialog acts 64, such as responses to the user's utterances 62. These system-generated dialog acts may seek confirmation of what the user is inferred to have requested in a prior utterance or may seek new information. The utterance representation component 40 generates a representation 66 of the dialogue at an initial time t, which constitutes one of the observations which the SST 32 uses to predict the dialog state at the subsequent time t+1. The execution component 42 executes the task identified from the dialogue, e.g., books a flight or restaurant for the user in illustrative examples.

The computer system 10 may include one or more computing devices 18, such as a desktop, laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data 50, 66.

The network interface 18 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Transactional Dialog State Tracking

A dialog state tracking task of interest can be formalized as follows: at each turn of the task-oriented dialogue, the information gathering component 38 of the dialog system 10 chooses a system dialog act 64, denoted $d_i^m$ to express and the user answers to the system with a user utterance 62, denoted u. The dialog state at each turn of a given dialog is defined as a distribution over a set of predefined variables to track that defines the structure of the dialog state. The construction of the dialog state is referred to as slot filling. In a transactional dialogue, the state tracking task entails estimating the value of each of a set of predefined variables in order to perform a procedure associated with the task to which the dialogue is supposed to correspond.

In one exemplary embodiment, where the utterances are spoken (voice) utterances, the information gathering component 36 includes an NLU module 70 which processes the user utterance u 62 and generates an N-best list: $o=\{<d_1, f_1>, \ldots, <d_n, f_n>\}$, where $d_i$ is a hypothesized user dialog act and $f_i$ is its associated confidence score. Each hypothesized user dialog act is a sequence of words (or, more generally, tokens) predicted to correspond to the user's utterance u. The NLU module 70 may receive as input the output of an automatic speech recognition (ASR) module 72, which converts the spoken utterance 62 to text. In a text based dialog system, where the utterances are in the form of text strings, the ASR module and optionally also the NLU module may be omitted and the text string(s) considered as the user dialog act d.

The representation 66 generated by the utterance representation generator 40 may include a bag of words representation of the respective turn of the dialogue. The bag of words representation may include, for each of a set of words, a value representative of whether or not the word is present in the user dialog act d (and optionally also the corresponding system dialog act). In the simple case, this may be considered as the only evidence on which the representation 66 is based. However, if an NLU module 70 is available, standardized dialog act schemas can be considered as (or part of) the evidence on which the representation is based. See, for example, Bunt, et al., "Towards an ISO standard for dialogue act annotation," Proc. 7th Intl Conf. on Language Resources and Evaluation (LREC'10), European Language Resources Association (ELRA), pp. 2548-2555, 2010. In one embodiment, if prosodic information (e.g., information on intonation, tone, stress and/or rhythm of the user utterance 62) is available in the output of an available ASR system 72, it can also be considered as evidence. See, Milone, et al., "Prosodic and accentual information for automatic speech recognition," IEEE Trans. on Speech and Audio Processing, 11(4):321-333, 2003.

The statistical dialog state tracker model 50 maintains, at each discrete time t+1, the probability distribution over the state $b(s_t)$ called the belief over the state.

Figure 2:
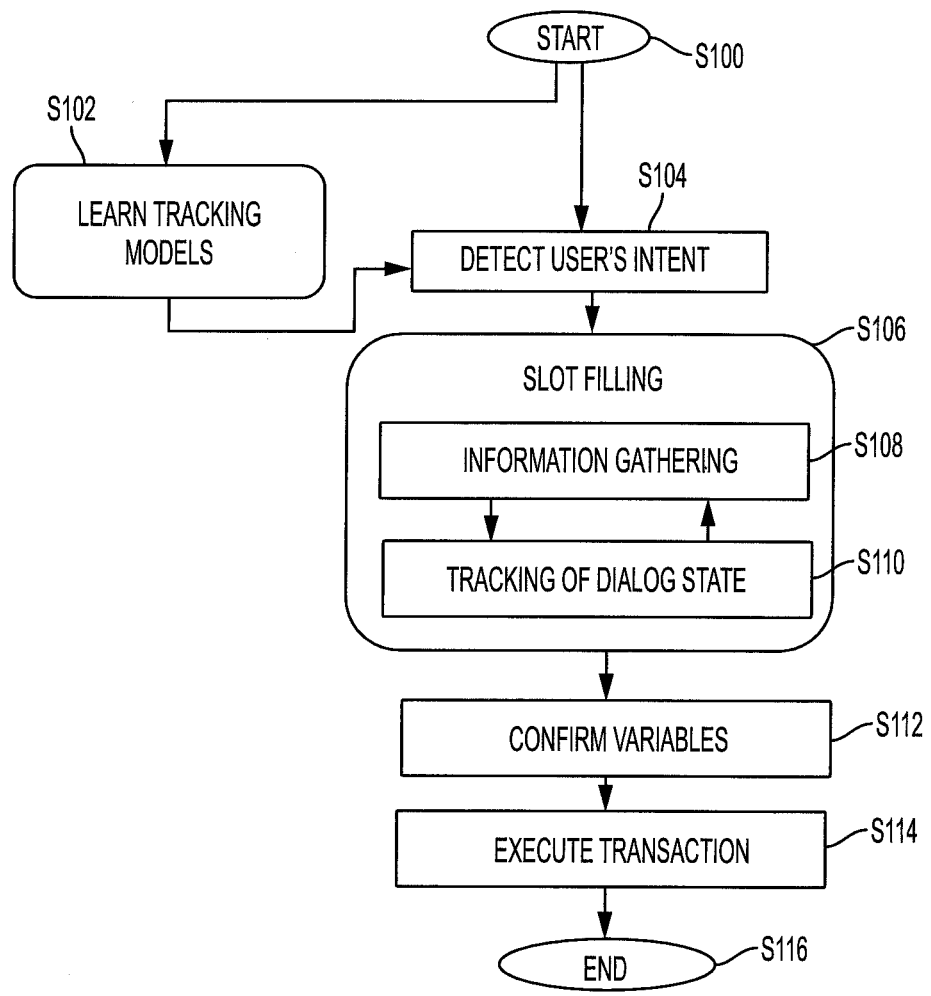
FIG. 2 is a flow diagram illustrating a dialog tracking method in accordance with another aspect of the exemplary embodiment.

The process of a slot-filling, transactional type of dialog management method is summarized in FIG. 2. The method begins at S100.

At S102, the tracking models A, B, C, and M are learned by the dialog tracker learning component using sequences of dialog turns annotated with their corresponding state descriptors.

At S104, in a new dialogue, the user's intent may be detected by the intent detection component 34. Intent detection is generally a NLU problem entailing identifying the task the user wishes the system to accomplish. This step determines the set of variables to instantiate during the slot-filling process (S106). The dialog management assumes that a set of variables is required for each predefined intent.

The slot filling process of dialog management (S106) includes the dual and sequential tasks of information gathering (S108) and dialog state tracking (S110). These are performed substantially iteratively until the predefined slots are each filled, e.g., with a respective most probable value of the respective variable having at least a threshold probability score. Once all the variables have been correctly instantiated, as in existing dialog systems, a last general confirmation of the task wished by the user is performed (S112) before executing the requested task (S114). The method ends at S116.

As noted above, two different statistical approaches have been used to maintain the distribution over the state regarding sequential NLU outputs. The discriminative approach aims at modeling the posterior probability distribution of the state at time t+1 with respect to the state at time t and observations $z_{1:t}$. The generative approach aims at modeling the transition probability and the observation probability in order to exploit possible interdependencies between hidden variables composing the dialog state. A description of these existing methods follows before describing the exemplary spectral state tracking learning and prediction methods.

Conventional Discriminative Dialog State Tracking

The discriminative approach of dialog state tracking computes the belief over each state using a trained conditional model that directly represents the belief $b(s_{t+1})=p(s_{t+1}|s_t,z_t)$. Maximum Entropy has been widely used for the discriminative approach, which formulates the belief over the state as follows:

$$b(s) = P(s|x) = \eta \cdot e^{w^T \phi(x)} \quad (1)$$

where:
η is a normalizing constant,
$x = (d_1^u, d_1^m, s_1, \ldots, d_t^u, d_t^m, s_t)$ is the history of: the user dialog acts $d_i^u$, $i \in \{1, \ldots, t\}$, the system dialog acts $d_i^m$, $i \in \{1, \ldots, t\}$, and the sequence of states $s_i$ to the current dialog turn at time t,
$\phi(\cdot)$ is a vector of feature functions on x,
w is the set of model parameters to be learned from dialog data, and
T is the transpose.

According to this formulation, the posterior computation has to be carried out for all possible state realizations in order to obtain the normalizing constant η. This is generally not feasible for real dialog domains that can have a large number of variables and possible variable values. Accordingly, for the discriminative approach to be tractable, the size of the state space is generally reduced. For example, one approach is to restrict the set of possible state variables to those appeared in the NLU results. See, Metallinou, et al., "Discriminative state tracking for spoken dialog systems," Association for Computer Linguistics," pp. 466-475, 2013. Another approach assumes conditional independence between dialog state components to address scalability, and uses conditional random fields. See, Lee, et al., "Unsupervised spoken language understanding for a multi-domain dialog system," IEEE Trans. on Audio, Speech & Language Processing, 21(11):2451-2464, 2013. Deep neural networks performing on a sliding window of utterance features extracted from previous user turns have also been suggested. See, Henderson, et al., "Word-based dialog state tracking with recurrent neural networks," Proc. SIGDIAL, pp. 296-299, 2014.

Conventional Generative Dialog State Tracking

The conventional generative approach to dialog state tracking computes the belief over each state using Bayes rule, with the belief from the last turn $b(s_{t-1})$ as a prior and the likelihood given the user utterance hypotheses $p(z_t|s_t)$. In Williams, et al., "Factored partially observable Markov decision processes for dialogue management," 4th Workshop on Knowledge and Reasoning in Practical Dialog Systems, pp. 76-82, 2005, the likelihood is factored and some independence assumptions are made:

$$b_t \propto \Sigma_{s_{t-1},z_t} p(s_t|d_{t-1}^m, s_{t-1}) p(z_t|s_t) b(s_{t-1}|h_{t-1}) p(z_t) \quad (2)$$

where:
$p(s_t|d_{t-1}^m, s_{t-1})$ is the probability of the state at time t given the system dialog act and state at time t−1,
$p(z_t|s_t)$ is the probability of the user utterance $z_t$ (e.g., bag of words representation) given the state at time t,
$b(s_{t-1}|h_{t-1})$ is the belief over the state at time t−1 given $h_{t-1}$ (a set of features describing the dialog from t=0 to t−1), and
$p(z_t)$ is the probability of the user utterance (e.g., bag of words representation).

A typical generative modeling of a dialog state tracking process uses a factorial hidden Markov model. See Ghahramani, et al., "Factorial hidden Markov models," Machine Learning, 29(2-3):245-273, 1997. In this family of approaches, scalability is often an issue. One way to reduce the amount of computation is to group the states into partitions, proposed as the Hidden Information State (HIS) model. See, Gasic, et al., "Effective handling of dialogue state in the hidden information state POMDP-based dialogue manager" J. ACM Trans. on Speech and Language Processing (TSLP), 7(3)4, 1-4, 2011. Another approach to cope with the scalability problem in this type of dialog state tracking is to adopt factored dynamic Bayesian networks by making conditional independence assumptions among dialog state components, and using approximate inference algorithms such as loopy belief propagation or blocked Gibbs sampling. See Thomson, et al., "Bayesian update of dialogue state: A POMDP framework for spoken dialogue systems," Computer Speech & Language, 24(4):562-588, 2010; and Raux, et al., "Efficient probabilistic tracking of user goal and dialog history for spoken dialog systems," INTERSPEECH, pp. 801-804, 2011.

A Decompositional Model for Coupled Temporal Hidden Variables Tracking

The exemplary decompositional model 50 and the learning and prediction procedures are now described in further detail. The method provides a generative/discriminative trade-off by selecting a generative model to make predictions but using a discriminative type of approach for learning the model, due to the choice of linear factors to conditionally link the variables composing the dialog state. This combines the accuracy of a discriminative model with the expressiveness of a generative model.

In one embodiment, the parameter learning procedure can be handled as a matrix decomposition task solved through Alternating Least Square Ridge regression or other suitable matrix decomposition method, such as stochastic gradient descent or proximal gradient methods. The ridge regression method allows asymmetric penalization of one or more of the targeted variables the state tracking identifies.

Figure 3:
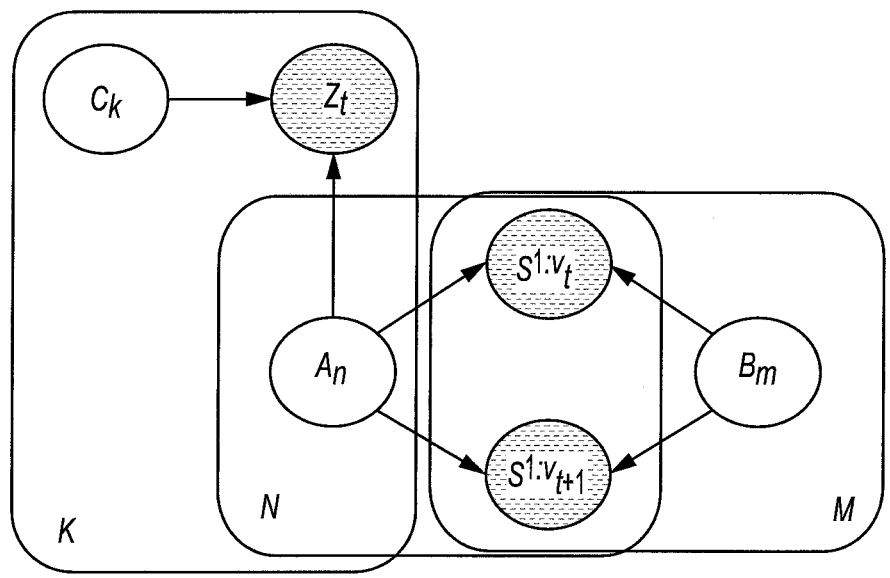
FIG. 3 illustrates a probabilistic graphical model of latent variables (directed model) of spectral state tracking in a transactional dialogue.
Figure 4:
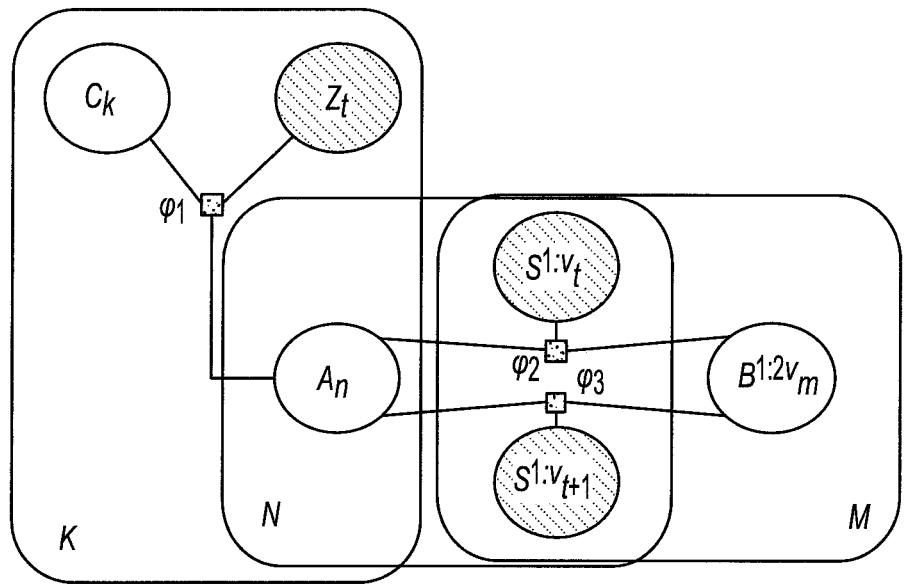
FIG. 4 illustrates a corresponding factor graph for the model of FIG. 3.

FIG. 3 illustrates the underlying probabilistic graphical model defining the Spectral State Tracking approach as a directed model of latent variables A, B, and C. FIG. 4 illustrates the corresponding factor model. In this model, the three factors are linear, $\phi_1:p(s_{t+1}|A,B_{s_{t+1}})=A^T B_{s_{t+1}}$, $\phi_2:p(s_t|A,B_{s_t})=A^T B_{s_t}$, and $\phi_3:p(z_t|A,C)=A^T C$, where $B_{s_t}$ is the column of matrix B that corresponds to the embedding of $s_t$ and $B_{s_{t+1}}$ is the column of B that corresponds to the embedding of the variables of $s_{t+1}$.

In the probabilistic graphical models of FIG. 3 and FIG. 4, K represents the number of descriptors composing an observation, N corresponds to the number of transition examples of the learning dataset, and M the number of descriptors, also called variables, describing the state to track.

Learning Method (S102)

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 5:
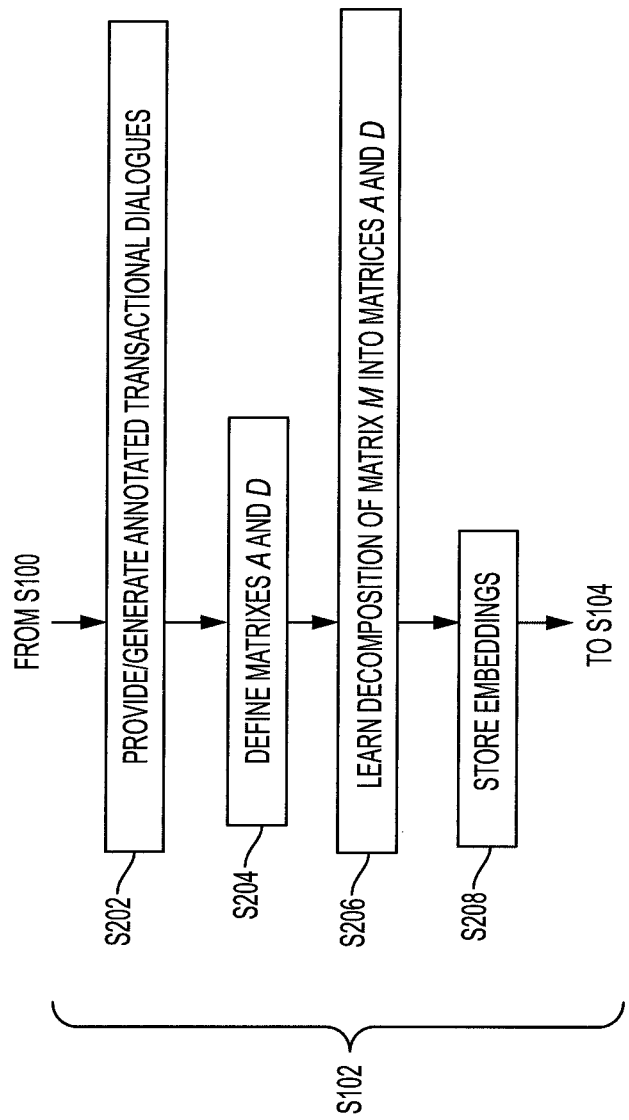
FIG. 5 illustrates learning of a generative model in the method of FIG. 2.

FIG. 5 illustrates an exemplary learning method. At S202, a set of annotated transactional dialogues is provided for the type of transaction being conducted (e.g., booking restaurants in the example case). Specifically, for each turn of each of these dialogues, the ground truth state is provided. For example, at a given turn, if the customer says "I want to eat in Barcelona," the turn is annotated with an update to the location, specifying the location at the end (time t+1) of the turn as being Barcelona, the other state variables being the same as at the beginning of the turn (time t).

Figure 6:
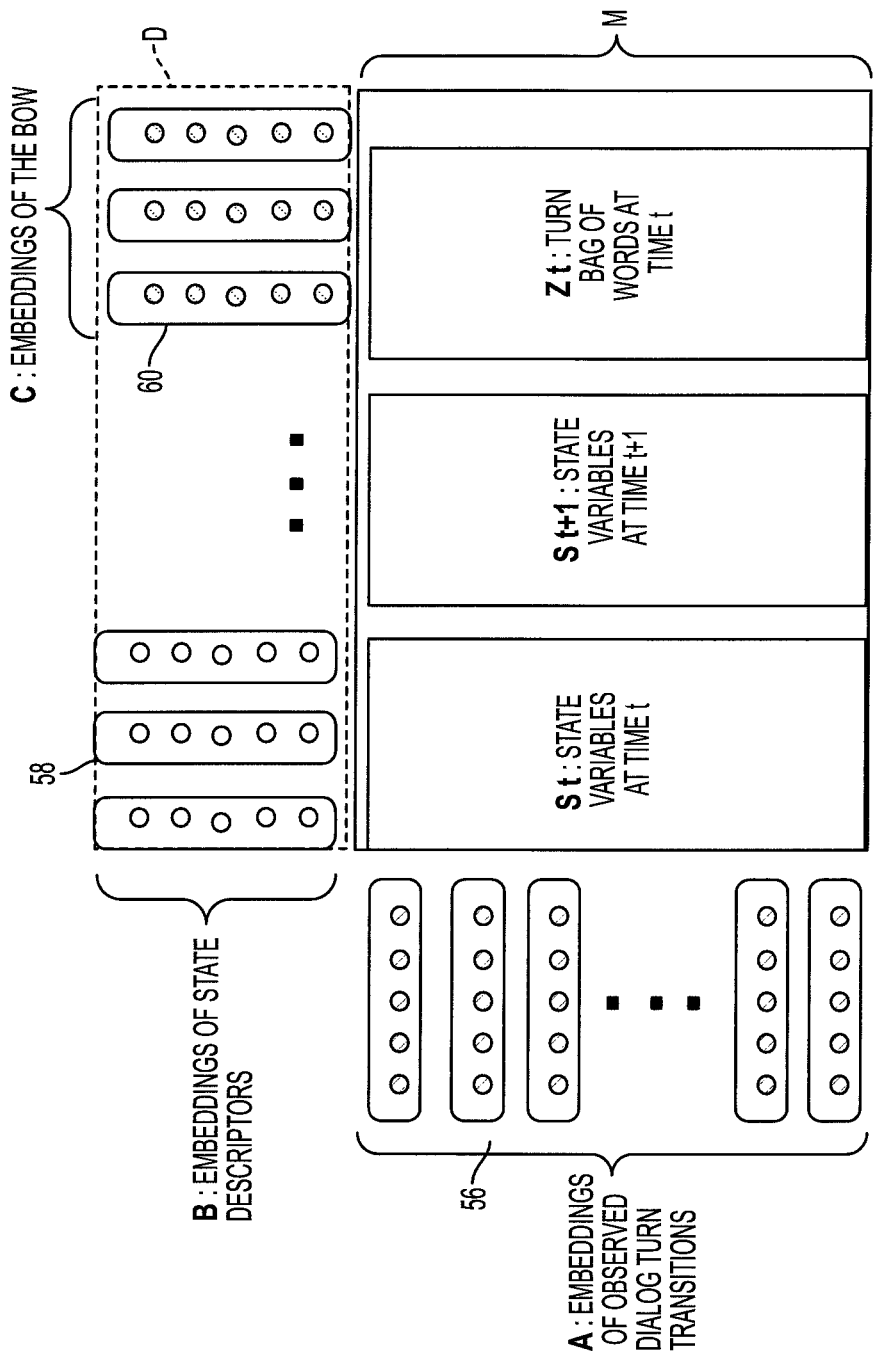
FIG. 6 illustrates an example spectral state tracking model in which collective matrix factorization is applied as an inference procedure.

At S204, matrices A, B and C are defined. FIG. 6 illustrates the collective matrix factorization task of the non-parametric learning procedure of the state tracking model. For the sake of simplicity, the B and C matrices are concatenated to form a single matrix D and M is the concatenation of the matrices $\{S_t, S_{t+1}, Z_t\}$.

In this step, matrix M is populated with the turn data. Specifically, each row includes the known values of each of the state variables before and after the transition and the corresponding dialog representation 66. Matrix M thus includes, for each of a plurality or rows, each row corresponding to a turn, initial and final state descriptors, i.e., values for each of the state variables at time t and corresponding values for each of the state variables at time t+1, and the observation $Z_t$ of what has been said at time t that is presumed to be responsible for the transition from state $s_t$ to $s_{t+1}$. Thus, for example, respective row of the matrix $Z_t$ is composed of a bag of words representation of the words that have been said between state t and state t+1 (and/or other features extracted from the utterance), e.g., as a 1 or 0 encoding for each of the set of possible words/features. The number of rows in Matrix M present during the leaning stage may be at least 20 or at least 100, or at least 1000, or more.

The first latent variable matrix A is instantiated with a row for each row of matrix M and matrices B and C are instantiated with a column for each of the possible state variable values and a column for each of the features in the dialog representation. At this time, the matrices A, B, and C are empty and may be initialized with random or otherwise generated initial values. At S206, a decomposition of matrix M into the first and second matrices A and D is learned, e.g., using an approximation method such as Alternating Least Squares method. In this step, the embeddings of the transitions (in matrix A) and each of the state variable values and each of the features in the dialog representation (in Matrix D) are jointly learned. As a result, each row of matrix A and each column of matrix D includes a set of hidden variables.

Matrices A, B, and C are low rank matrices. In the latent variable matrix A, each row (embedding) represents a respective embedding of a transition populating corresponding row of the matrix M (state at time t, state at time t+1, and representation of the user dialog act). Each row thus includes a set of latent variables (illustrated by dots in FIG. 6), which constitute the embedding of one of the transitions. The number of latent variables (columns of matrix A) is fixed, and may be, for example, at least 5, or at least 10, or at least 50, or at least 100, and may be up to 10,000, or up to 1000. The latent variable matrix B includes the embedding of the variables that represent the embeddings of each possible state variable at time t and at t+1. Each column corresponds to a (state variable, value) pair which has a precise value (a 0,1 encoding), and the latent variables in that column constitute the embedding of that pair. The latent variable matrix C includes the embedding of the bag of word representations. In matrix C, each column represents one of the set of words (and/or other features) in the bag of words/other features. The number of latent variables (rows) in matrices B and C is fixed, and may be, for example, at least 5, or at least 10, or at least 50, at least 100, and may be up to 10,000, or up to 1000. Since the two matrices B and C are concatenated to form matrix D, they have the same number of latent variables. Matrices A and D may have the same number of latent variables. The more latent variables used, the easier it is to reconstruct an approximation of matrix M as the product of latent variable matrices A and B. However, this comes at increased computational cost and may lead to poorer prediction performance at higher numbers of variables. The optimal number of latent variables may depend on the dataset and may be selected by ranking the performance of the system using different values.

At S208, the latent variable matrices A and D are stored.

Equation 3 defines the exemplary optimization task performed in step S206, i.e., the loss function, associated with the learning of latent variables {A, D}.

$$\min_{A,D} \|(M - AD)W\|_2^2 + \lambda_a \|A\|_2^2 + \lambda_a \|D\|_2^2, \quad (3)$$

i.e., a function of the minimum of the difference between actual matrix M and the product of latent variable matrices A and B, conditioned by weights W, and where $\{\lambda_a, \lambda_d\} \in \mathbb{R}^2$ are optional regularization hyper-parameters (scalar values) which can be learned by cross validation, and W is a diagonal matrix that increases the weight some of the state variables, $s_{t+1}$ in order to bias the results toward better predictive accuracy on these specific variables. The weight matrix can be learned by cross validation. The weights are selected to improve the agreement of reconstructed matrix M' (formed as the product of matrices A and B) with the actual matrix M. This type of weighting approach has been shown as efficient in other generative/discriminative trade-off kinds of tasks. See, e.g., Ulusoy, et al., "Comparison of generative and discriminative techniques for object detection and classification," Toward Category-Level Object Recognition, pp. 173-195, 2006, Bishop, et al., "Generative or discriminative? Getting the best of both worlds," BAYESIAN STATISTICS, 8:3-24, 2007. $\|\cdot\|_2^2$ represents the Frobenius norm of the respective matrix (the square root of the sum of the absolute squares of its elements). However, other matrix norms may be employed. In the exemplary embodiment, the weight matrix has a greater impact on at least some of the final state descriptor features of the reconstructed matrix M than for the corresponding features of the initial state descriptor.

For performing the minimization task shown in Eqn. 3, a matrix decomposition method may be used, such as the Alternating Least Squares method, which is a sequence of two convex optimization problems. In a first step, for known D, the matrix A which minimizes Eqn. 4 is computed:

$$A^* = \arg\min_A \|(M-AD)W\|_2^2 + \lambda_a \|A\|_2^2, \quad (4)$$

Then for a known A, the matrix D which minimizes Eqn. 4 is computed:

$$D^* = \arg\min_B \|(M-AD)W\|_2^2 + \lambda_d \|D\|_2^2 \quad (5)$$

At the start, matrix A (and/or D) may be initialized with random values or with a singular value decomposition of matrix M.

By iteratively solving the two optimization problems, the following fixed-point regularized ridge regression forms of the weighted alternating least square algorithms are obtained:

$$A \leftarrow (D^T W D + \lambda_a \Pi)^{-1} D^T W M \quad (6)$$

$$D \leftarrow (A^T A + \lambda_d \Pi)^{-1} A^T M \quad (7)$$

where Π is the identity matrix. As presented in Equation 6, the W matrix is only applied for the updating of A because only the columns of D, representing the features of the state, are weighted differently. For the optimization of the embeddings of D, presented in Equation 7, each call session embeddings stored in A holds the same weight, so in this second step of the algorithm, W is actually an identity matrix and so does not appear. More precisely, the state variables are a concatenated zero-one encoding of the set values of each variables.

Prediction Method (S106)

When a new observation $Z_t$ is received at time t, the posterior distribution of each of the state variables at time t+1 is predicted given $s_t$ and the latent variable matrices A and D.

The prediction step entails (1) computing the embedding of the current transition by solving the corresponding least square problem based on the two variables $\{s_t, z_t\}$ that constitute the current knowledge of the state at time t and the bag of words of the last turn composed from the system and user utterances (generating a new row in matrix A); and (2) estimating the missing values of interest, i.e., the likelihood of each value of each of the variables that constitute the state $s_{t+1}$ at time (t+1), by computing the cross-product between the transition embedding calculated in (1) and the corresponding column embeddings of matrix D, of the value of each variable of $s_{t+1}$. More precisely, this decomposition can be written as:

$$M = A \cdot D^T \quad (8)$$

where M is the matrix of data used to perform the decomposition. M includes a row $m_i$ for each transition. As noted above, A has a row for each transition embedding, and D has a column for each variable-value embedding in a zero-one encoding. When a new row of observations $m_i$ is received for a new set of variables for state $s_t^i$ and observations $m_i$ and D is fixed, the purpose of the prediction task is to find the corresponding row $a_i^T$ of A to be such that:

$$a_i^T \cdot D^T \approx m_i^T \quad (9)$$

It is generally difficult to require these to be equal, however it can be required that they have the same projection into the latent space:

$$a_i^T = m_i^T \cdot D \cdot (D^T \cdot D)^{-1} \quad (10)$$

Then, the classic closed form solution of a linear regression task can be derived as follows:

$$a_i^T = m_i^T \cdot D \cdot (D^T \cdot D)^{-1} \quad (11)$$

$$a_i = (D^T \cdot D)^{-1} \cdot D^T \cdot m_i \quad (12)$$

This formula is in fact the optimal value of the embedding of the transition $m_i$, assuming that a quadratic loss is used. Otherwise it is an approximation, in the case of a logistic loss for example. As will be appreciated, while in Eqn. 11, $(D^T \cdot D)^{-1}$ entails a matrix inversion, it is only for a low dimensional matrix (the size of the embeddings).

Thus, given $m_i$ (which includes only the values of 4 and 4), at step (1) the embedding $a_i$ is computed using Eqn (12). Then at step (2) the missing values $s_{t+1}^i$ are computed by multiplying $a_i$ by only those the columns of matrix B corresponding to the embeddings of the $s_{t+1}$ state features.

The prediction output is the distribution over the values for each of the state variables $s_{t+1}$ at time t+1. This distribution, or the most probable values, can be propagated to the next row of the matrix as $s_t$, and the prediction method iterated at each interaction with the customer until the predefined variables have been instantiated. As will be appreciated, at some iterations, there may be no change to the state variables.

Several advantages can be identified in this approach. First, at learning time, alternative ridge regression is computationally efficient because a closed form solution exists at each step of the optimization process employed to infer the parameters, i.e., the low rank matrices, of the model. Second, at decision time, the state tracking procedure entails (1) computing the embedding a of the current transition using the current state estimation $s_t$ and the current observation set $z_t$, and (2) computing the distribution over the state defined as a vector-matrix product between a and the latent matrix D.

FIG. 7 illustrates generation of the matrix M at prediction time (i . . . after learning the row and column embeddings forming matrices A and D. The system first establishes the customer's intent-to find a restaurant (S106). The intent can be inferred from the user having logged onto an associated restaurant booking website, and/or through simple questions (e.g., "to book a restaurant say Yes or press 1 now", . . . (waits for customer answer), . . . to book a hotel, say Yes or press 2, now"). The system then instantiates the correct matrix M with the appropriate set of slots. For ease of illustration, it is assumed that there are only three variables, location, type, and time, for the restaurant booking matrix M and only two values for each variable. The matrix M also includes a slot for each of a set of words that the system is configured for recognizing in the bag of words representation 66 composed from the system and customer utterances 64, 62 for a given turn.

At a first turn (turn 1), the information gathering component 36 generates a system utterance 64 asking where the customer would like to eat and the customer responds. The information gathering component 36 analyzes the customer utterance 62. The representation generation component 40 identifies a bag of words from the output of the information gathering component, which includes the words eat and Rome. The slot filling component 38 populates the $s_t$ values and bag of words representation in a row of the matrix. The dialog tracker prediction component 30 predicts the $s_{t+1}$ values for this row, using the learned latent variable matrices A and D. These values become the $s_t$ values for the next turn. In this turn, the user's utterance has not been recognized with sufficient confidence and so in the next turn, the information gathering component asks if the customer said Spanish, which the customer confirms, and the prediction is repeated. Once a slot has been turned to 1 for each of the variables, the system confirms the customer's goal (turn 5), before proceeding to execution of the transaction, which may include searching for Spanish restaurants in Rome in a database which have a table available at 8 pm and presenting a list to the customer for review and selection. The system may then make a restaurant booking for the customer, based on the customer's selection.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary method and system provided advantages over existing systems (1) by producing a joint probability modelization of the hidden variables transition composing a given dialog state and the observations that allows tracking the current belief about the user goals while explicitly considering potential interdependencies between state variables; and (2) by providing a computational framework, based on collective matrix factorization, for efficiently inferring the distribution over the state variables in order to derive an adequate dialog policy of information seeking in such a context. While transactional dialog tracking is mainly useful in the context of autonomous dialog management, the system may also find application in dialog machine reading and knowledge extraction from human-to-human dialog corpora.

Without intending to limit the scope of the exemplary embodiment, the following examples illustrate application of the method to a preexisting dataset.

EXAMPLES

The dialog domain used for the evaluation of the dialog tracker and the component probability models used for the domain are first described. Then, a set of experimental results obtained with the tracker and a comparison to existing trackers is described.

The DSTC-2 dialog domain described in Williams, et al., "The dialog state tracking challenge," Proc. SIGDIAL 2013 Conf., pp. 404-413, 2013, was used. In this domain, the user queries a database of local restaurants. The dataset for the restaurant information domain was originally collected using Amazon Mechanical Turk. A usual dialog proceeds as follows: first, the user specifies his personal set of constraints concerning the restaurant. Then, the system offers the name of a restaurant that satisfies the constraints. The user then accepts the offer, and may request additional information about the accepted restaurant. The dialog ends when all the information requested by the user has been provided. In this context, the dialog state tracker should be able to track three types of information that compose the dialog state: the geographic area, the food type, and the price range slots. As will be appreciated, the tracker can easily be set up to track other variables as well if they are fully specified. The dialog state tracker updates the belief turn by turn, receiving evidence from the NLU module as the actual utterance produced by the user.

In this experiment, the output of the NLU module was restricted to a bag of word representation of each user utterance in order to be comparable to existing approaches for state tracking that only use such information as evidence. The task of the dialog state tracker 32 is to generate a set of possible states and their confidence scores for each slot, with the confidence score corresponding to the posterior probability of each variable state. Further, the dialog state tracker also maintains a special variable state, called "None," which represents that the true goal state has not been observed yet.

Experimental results of state tracking were obtained for this dataset and compared with existing generative and discriminative approaches. Table 1 gives the variables and expression domain for each of them.

TABLE 1

Information slots in DSTC2 (Restaurant Information Domain)

| Slot | Number of modalities |
|---|---|
| area | 5 possible values |
| food | 91 possible values |
| price range | 3 possible values |

Table 2 details the performance results in precision at position n (P@n) obtained on the DSTC-2 dataset for a set of embedding dimensions of the collective matrix factorization model. The model manages to determine accurately a small subset of hypothesis where the correct instantiation is present for each variable.

Then, for the purpose of comparison to the existing methods, Table 3 presents accuracy results of the best CMF model, with an embedding dimension of 100, where the value of each slot is instantiated as the most probable with respect to the inference procedure described above. Results are obtained for several existing methods of generative and discriminative state tracking on this dataset. More precisely, as provided by such approaches, the accuracy score computes $p(s_{t+1}|s_t, z_t)$.

The following existing trackers were compared:
1. A rule-based system described in Zilka, et al., "Comparison of Bayesian Discriminative and Generative Models for Dialogue State Tracking," Proc. SIGDIAL 2013, pp. 452-456, 2013.
2. A HMM model (HWU) as described in Wang, "HWU baseline belief tracker for DSTC 2 & 3," Technical Report, Heriot-Watt University, 2013.
3. A modified HMM model (HWU+) described in Wang 2013.
4. A maximum entropy (MaxEnt) model as described in Lee, et al., "Recipe for building robust spoken dialog state trackers: Dialog state tracking challenge system description," Proc. SIGDIAL 2013, pp. 414-422, 2013, which is a type of discriminative model.
5. A deep neural network (DNN) architecture as described in Henderson, et al., "Word-based dialog state tracking with recurrent neural networks," Proc. SIGDIAL, pp. 296-299, 2014.
6. CMF—the present method, where the number following represents the size of the embedding vectors in each of matrices, B, C. Thus, for example, CMF-100 indicates that the embedding matrix has 100 hidden variables in each row and matrices B, C have 100 hidden variables in each column.

TABLE 2

Accuracy of the proposed model compared to other trackers on the DSTC-2 dataset

| Model | Avg Accuracy |
|---|---|
| 1. Rule-based | 0.73 |
| 2. HMM model HWU | 0.71 |
| 3. HWU+ | 0.66 |
| 4. MaxEnt [LE13] | 0.72 |
| 5. DNN | 0.89 |
| 6. CMF-100 | 0.92 ± 0.004 |

TABLE 3

10-fold cross validated precision results obtained for each of the three simultaneously tracked variables (Area, Food type and Price Range) of the DSTC-2 dataset

| | Area | | Food type | | | Price range | |
|---|---|---|---|---|---|---|---|
| Model | P@1 | P@2 | P@1 | P@2 | P@5 | P@1 | P@2 |
| CMF-10 | 0.69 ± 0.04 | 0.83 ± 0.02 | 0.26 + 0.008 | 0.34 ± 0.014 | 0.52 ± 0.01 | 0.87 ± 0.02 | 0.94 ± 0.013 |
| CMF-50 | 0.97 ± 0.006 | 0.98 ± 0.005 | 0.75 ± 0.01 | 0.78 ± 0.01 | 0.81 ± 0.011 | 0.97 ± 0.006 | 0.98 ± 0.004 |
| CMF-100 | 0.97 ± 0.005 | 0.98 ± 0.003 | 0.83 ± 0.009 | 0.85 ± 0.007 | 0.86 ± 0.007 | 0.974 ± 0.004 | 0.98 ± 0.003 |
| CMF-150 | 0.90 ± 0.007 | 0.95 ± 0.004 | 0.85 ± 0.009 | 0.90 ± 0.006 | 0.93 ± 0.004 | 0.93 ± 0.007 | 0.98 ± 0.002 |
| CMF-200 | 0.831 ± 0.004 | 0.903 ± 0.007 | 0.88 ± 0.01 | 0.94 ± 0.007 | 0.96 ± 0.006 | 0.86 + 0.011 | 0.934 ± 0.006 |
| CMF-500 | 0.86 ± 0.01 | 0.92 ± 0.009 | 0.67 ± 0.01 | 0.78 + 0.01 | 0.85 ± 0.008 | 0.88 ± 0.01 | 0.95 ± 0.003 |
| CMF-1000 | 0.78 ± 0.14 | 0.90 ± 0.08 | 0.50 ± 0.19 | 0.56 ± 0.19 | 0.66 ± 0.16 | 0.83 ± 0.11 | 0.93 ± 0.05 |

The results suggest that the exemplary system and method provide for efficient dialog state tracking in the context of transactional type of autonomous dialog systems. The results suggest that consumer care services and more broadly in the context of chat automation agent platforms, will be able to handle dialog management more efficiently using the system and method. Indeed, issues related to contracting, billing, device insurance management can be automated using such framework. The system and method will clearly be applicable to any dialog domain that can be formalized as a slot-filling type of task. More precisely, such a system allows efficient tracking of hidden variables defining the user goal of a task-oriented dialog using any kind of available evidence, from utterance bag-of-words to the output of a Natural Language Understanding module.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for dialog state tracking comprising:
  learning first and second latent variable models;
  providing the first and second latent variable models learned by reconstructing a decompositional model in the form of a matrix, the decompositional model having been generated from annotated training dialogues and including, for each of a plurality of dialog state transitions, state descriptors for initial and final states of the transition and a respective dialogue representation, the state descriptors for the initial and final states each including a value for each of a predefined set of state variables, the learned first latent variable model including embeddings of the plurality of state transitions, and the learned second latent variable model including embeddings of features of the state descriptors and embeddings of features of the dialogue representations;
  receiving data for a new dialog state transition, the data including a state descriptor for the initial state and a respective dialogue representation which is based on a user utterance, the state descriptor for the initial state including a value for each of the predefined set of state variables;
  predicting a state descriptor for the final state of the new dialog state transition using the learned first and second latent variable models, the state descriptor for the final state including a value for each of the predefined set of state variables; and
  outputting, to a client device, an agent dialog act based on the predicted state descriptor for the final state, and wherein the predicting of the state descriptor is performed with a processor.

2. The method of claim 1, wherein the first and second latent variable models are jointly learned.

3. The method of claim 1, wherein the learning is performed by collective matrix factorization.

4. The method of claim 1, wherein the learning of the first and second latent variable models is iteratively performed to optimize a loss function.

5. The method of claim 4, wherein the loss function is a function of a minimum of the difference between the decompositional model and a product of the latent variable models, conditioned by weights that increase the weight some of the state descriptor features, and optionally a function of regularization terms which are each a function of one of the latent variable models.

6. The method of claim 5, wherein the optimizing the loss function comprises:
  repeating first and second steps,
    wherein in the first step, with the embeddings in the second latent variable model fixed, computing the embeddings of the first latent variable model which minimize a function of the decompositional model, the weights, and the second latent variable model, and
    wherein in the second step, with the embeddings in the first latent variable model fixed, computing the embeddings of the second latent variable model which minimize a function of the decompositional model and the first latent variable model, without the weights.

7. The method of claim 5, wherein the weights that increase the weight some of the state descriptor features increase the weight of some of the features of the final state descriptor more than the corresponding weights of features of the initial state descriptor.

8. The method of claim 1, wherein the predicting of the state descriptor for the final state of the new dialog state transition comprises computing an embedding of the state descriptor for the initial time and the respective dialogue representation and multiplying the embedding by the embeddings of the second latent variable model corresponding to the embeddings of the state descriptor for the final time.

9. The method of claim 1, wherein the state descriptors at the initial time and final time each represent a distribution over each of a plurality of variables of a transaction.

10. The method of claim 1, wherein the dialogue representation comprises a bag of words representation derived, at least in part, from a user utterance.

11. The method of claim 1, wherein the bag of words representation is also derived from an automatically-generated agent dialog act.

12. The method of claim 1, further comprising repeating the receiving of data for a new dialog state transition and the predicting of a state descriptor for the final state of the new dialog state transition for each of a plurality of turns of a dialogue.

13. The method of claim 1, further comprising generating an agent dialog act based on the predicted state descriptor for the final state.

14. The method of claim 13, when the agent dialog act is output in a form which is audible to a user on a client device.

15. A system for dialog state tracking comprising:
  a learning component for learning first and second latent variable models;
  memory which stores the first and second latent variable models, each in the form of a matrix, that have been learned by reconstructing a decompositional model in the form of a matrix, the decompositional model having been generated from annotated training dialogues and including, for each of a plurality of dialog state transitions, state descriptors for initial and final states of the transition and a respective dialogue representation, the learned first latent variable model including embeddings of the plurality of state transitions, and the learned second latent variable model including embeddings of features of the state descriptors and embeddings of features of the dialogue representations;
  an information gathering component which, during a dialog, receives an utterance of a user for each of a plurality of new dialog state transitions;
  a representation generation component which generates a dialog representation based on the user utterance;
  a prediction component which predicts a state descriptor for a final state of each new dialog state transition using the learned first and second latent variable models, an initial state descriptor and the respective dialog representation;

an execution component which executes a task associated with one of the predicted final state descriptors; and
a processor which implements the information gathering component, representation generation component, and the prediction component.

16. A method for identifying a transaction comprising:
learning first and second latent variable models for reconstructing a decompositional model, the decompositional model having been generated from annotated training dialogues and including, for each of a plurality of dialog state transitions, state descriptors for initial and final states of the transition and a respective dialogue representation, the learned first latent variable model including embeddings of the plurality of state transitions, and the learned second latent variable model including embeddings of features of the state descriptors and embeddings of features of the dialogue representations;
for each of a plurality of turns of a dialogue:
receiving data for a new dialog state transition, the data including a state descriptor for the initial state and a respective dialogue representation;
predicting a state descriptor for the final state of the new dialog state transition using the learned first and second latent variable models, including computing an embedding of the new dialog state transition in the first latent variable model and computing a distribution over the state as a vector-matrix product between the embedding and the second latent variable model;
generating an agent dialog act based on the predicted state descriptor; and
implementing a transaction identified based on the predicted final state of at least one of the turns of the dialogue.

* * * * *